United States Patent [19]

Voll et al.

[11] 4,398,774
[45] Aug. 16, 1983

[54] CARRIER IN A BEARING ASSEMBLY FOR ENABLING AXIAL MOTION OF A FREE END OF A DRIVE SHAFT

[75] Inventors: Horst Voll, Hassfurt; Gerhard Braüne, Euerbach, both of Fed. Rep. of Germany

[73] Assignee: Fag Kugelfischer Georg Schäfer & Co., Schweinfurt, Fed. Rep. of Germany

[21] Appl. No.: 301,812

[22] Filed: Sep. 11, 1981

[30] Foreign Application Priority Data

Sep. 13, 1980 [DE] Fed. Rep. of Germany ....... 3034651

[51] Int. Cl.³ ............................................. F16C 27/04
[52] U.S. Cl. ................................................ 308/184 R
[58] Field of Search ....... 308/26, 28, 184 R, DIG. 14, 308/184 A, 189 R, 207 R; 384/202, 215

[56] References Cited

U.S. PATENT DOCUMENTS 3,697,144 10/1972 Beeskow .......................... 308/184 R
3,709,570 1/1973 Galbato ........................... 308/184 R

FOREIGN PATENT DOCUMENTS 161018 2/1903 Fed. Rep. of Germany .
1978055 5/1967 Fed. Rep. of Germany .
6938461 1/1970 Fed. Rep. of Germany .
1625537 2/1972 Fed. Rep. of Germany .
2155048 7/1972 Fed. Rep. of Germany .
730450 8/1932 France .
914440 10/1946 France .
1212500 11/1980 United Kingdom .

*Primary Examiner*—Lenard A. Footland
*Attorney, Agent, or Firm*—Karl F. Ross; Herbert Dubno

[57] ABSTRACT

In a bearing assembly supporting the free end of a drive shaft, a carrier for enabling axial motion of the assembly to accommodate thermal expansion of the shaft during extended power-transmission operations has a meandering cross-section with a thin U-shaped central or middle section and a pair of thick-walled Z-shaped peripheral sections. The sections are annular and together define a central wide groove and a pair of flanking narrow grooves. The inner Z-shaped section is attached to the outer race of a bearing whose other race is rigid with the shaft, while the outer Z-shaped section is fastened to a housing. The thin walls of the central carrier section permits a limited axial movability of the bearing assembly, while the annular shapes of the carrier sections, in particular the thick sections, inhibit axial or transverse motion of the shaft. A radial face of the inner Z-shaped carrier section defines, together with an inner surface of the housing, a gap which receives oil from a lubricating sump in the housing, the oil in the gap serving to damp axial shocks and vibrations in the shaft arising from the load.

3 Claims, 1 Drawing Figure

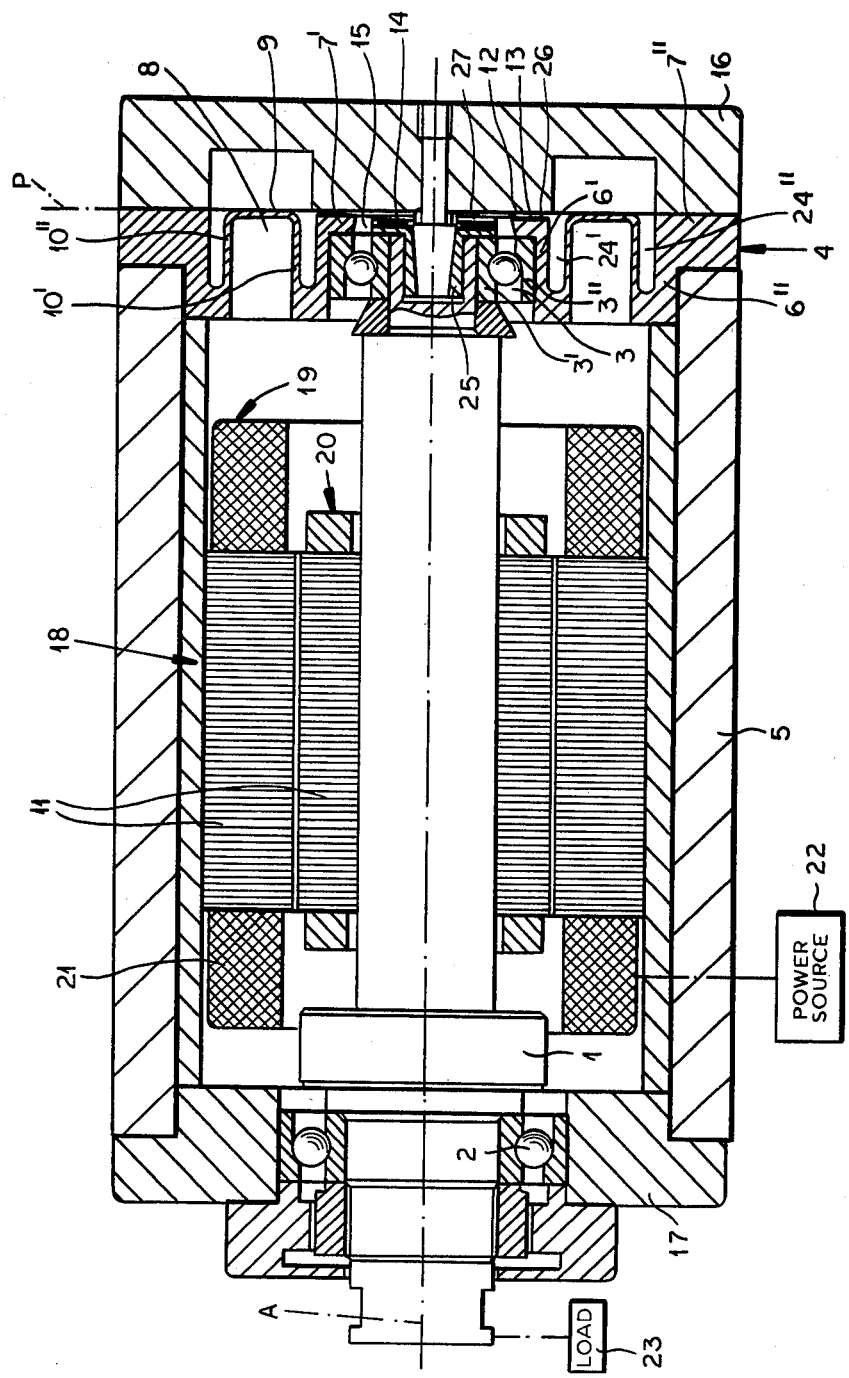

CARRIER IN A BEARING ASSEMBLY FOR ENABLING AXIAL MOTION OF A FREE END OF A DRIVE SHAFT

FIELD OF THE INVENTION

Our present invention relates to a bearing assembly and, more particularly, to a carrier in such an assembly for facilitating an axial shifting thereof to accommodate thermal expansion of a drive shaft.

BACKGROUND OF THE INVENTION

As described in German patent document (Offenlegungsschrift) No. 21 55 048, a bearing assembly for supporting the free end of a drive shaft includes a ball or roller bearing with an inner race embracing the shaft and an outer race engaging an annular support or carrier with an S-shaped cross-section, the carrier being attached at an outer periphery to an inner surface of the housing. The carrier has a center piece in the form of an annular web coaxial with a rotation axis of the shaft and provided with a multiplicity of axially extending slits for ensuring flexibility of the carrier. Such a bearing assembly adequately accommodates axial motion of the free end of the shaft due to thermal expansion thereof during extended power-transmission operations; however, the carrier introduces a radial flexibility which is unacceptable for certain drive-shaft applications where an exact positioning of the shaft is required.

Another German patent document (Gebrauchsmuster) No. 69 38 461 discloses a bearing assembly wherein the carrier or support is in the form of an annular disk. Such a bearing assembly sufficiently limits the radial or transverse motion of the free end of the drive shaft. However, the rigidity also extends to the axial direction, thereby insufficiently providing for accommodation of the shaft's thermal expansion. If thermal expansion of the shaft is not adequately provided for, the shaft is subjected to axial stresses in addition to those arising from the load. The consequent increase in the effective load leads to a diminution of the shaft's life expectancy.

A supporting member or carrier in a bearing assembly according to another German patent document (Offenlegungsschrift) No. 16 25 537 comprises an annular plate of uniform thickness bent at several radial locations to form a corrugated-type disk. Such a disk is generally ineffective in compensating or accommodating the thermal expansion of the shaft, the plate or disk being relatively rigid in an axial direction.

Yet another German patent document (Gebrauchsmuster) No. 19 78 055 discloses a carrier member made of rubber and having a meandering or undulating cross-section. A bearing assembly with such a carrier or supporting member is very flexible and yields too much in a radial direction.

OBJECTS OF THE INVENTION

An object of our present invention is to provide an improved carrier or supporting member in a bearing assembly of the aforementioned type, which increases the life expectancy of the drive shaft.

Another, more particular, object of our present invention is to provide such a carrier which facilitates axial motion of the free end of the shaft due to thermal expansion yet inhibits radial motion or pivoting of the shaft.

Yet another object of our present invention is to provide such a bearing assembly which damps axial shocks and vibrations in the shaft arising from power transmission to the load.

SUMMARY OF THE INVENTION

A metallic bearing carrier or support for assembly with a bearing having a race rotatable about an axis comprises, according to our present invention, a thin-walled annular section extending in a plane substantially perpendicular to the rotation axis, a thin-walled cylindrical section coaxial with the same and integral at one end with a periphery of the annular section or web and a thick-walled cylindrical section coaxial with the thin-walled section and integral with an end thereof opposite the web. The cylindrical sections together form a narrow groove, while the thick-walled section has a thick flange forming a first attachment member extending parallel to the web. An additional cylindrical section coaxial with the rotation axis and integral with the web extends in the same direction therefrom as the thin-walled cylindrical section, forming therewith a wide groove coaxial with the narrow groove. The additional cylindrical section is provided with a second attachment member whereby the carrier is fastened at the addition section to a housing or to a race of the bearing.

According to another feature of our present invention, the additional cylindrical section is thin-walled and is connected at an end opposite the web to another thick-walled cylindrical section which is coaxial with all the cylindrical sections as well as the grooves. This second thick-walled section and the additional thin-walled section together form an additional narrow groove coaxial with the wide groove. Preferably, the second attachment member is in the form of another thick flange connected to the second thick-walled section and extending therefrom parallel to the web.

A carrier according to our present invention is designed to be mounted in a housing and to form part of a bearing assembly supporting the free end of a drive shaft. The annular forms of the various carrier sections provide a stiffness which braces the shaft's free end against motion perpendicular or transverse to the shaft's rotation axis, while the corrugated, meandering or bellows-like cross-section of the carrier, together with the thin walls of the middle sections and the thick walls of the outer sections, facilitates an axial motion of the bearing assembly to accommodate thermal expansions of the shaft during extended power transmission operations. Additional axial loading during thermal expansion is minimized in a bearing assembly having a carrier according to our present invention; thus the life expectancy of the shaft is maximized.

According to a particular feature of our present invention, one of the attachment flanges is an inner flange provided with an annular face extending radially inwardly, transversely to the rotation axis, and coacting with an inner surface of the housing to define a gap for receiving fluid, such as lubricating oil from a sump in the housing, to absorb axial shocks and vibrations applied to or developed into said shaft.

Another advantage of a bearing assembly with a carrier or supporting member according to our present invention is a simplification of production or manufacture. The carrier is a single piece incorporating a central U-section yielding portion and peripheral thick-walled portions for attaching or fastening the carrier to the shaft or the housing and to a race of the bearing. Moreover the meandering cross-section of the carrier facilitates assemblage, particularly with respect to implementing the seating of the attachment flanges in the housing and on the bearing race, and a carrier according to our present invention occupies a minimum of space.

BRIEF DESCRIPTION OF THE DRAWING

These and other features, objects and advantages of our present invention will now be described in detail with reference to the drawing the sole FIGURE of which is a longitudinal cross-section view, partially diagrammatic, of an axially shiftable bearing assembly with a carrier or supporting member according to our present invention, showing the mounting of the bearing assembly in a housing carrying a motor and a drive shaft.

SPECIFIC DESCRIPTION

As illustrated in the drawing, a carrier or support 4 for assembly with a bearing 3 at a free end of a drive shaft 1 for accommodating thermal expansion thereof during extended power transmission operations comprises, according to our present invention, a relatively thick annular flange 7″ which, in an assembled state of the bearing 3 and the carrier 4, is gripped between a cylindrical motor housing 5 and an end or cover plate 16. A radially and axially fixed thrust bearing 2 is mounted in another cover plate 17 attached to housing 5 at an end thereof opposite plate 16. In addition to supporting shaft 1 at fixed bearing 2 and axially shiftable bearing 3, housing 5 holds an electric motor 18 having a stator 19 and a rotor 20 with laminated-plate cores 11 and current-conducting coils or field windings 21, as is well known in the art, windings 21 being connected through housing 5 to a source 22 of electrical power. At an end proximal to fixed bearing 2, drive shaft 1 is operatively connected to a load 23.

Although bearings 2 and 3 are illustrated as having cylindrical races, the bearings are advantageously arranged in an X-type configuration for transmitting axial stresses as well as radial loads. Thrust bearings 2 and 3 then have frustoconical races rather than cylindrical ones.

Bearing carrier or shield 4 comprises, in addition to outer flange 7″, a thin-walled annular section or web 9 extending in a plane P perpendicularly to a rotation axis A of shaft 1. Integral with inner and outer peripheries of web 9 are an inner thin-walled cylindrical section 10′ and an outer thin-walled cylindrical section 10″ which are coaxial with axis A and extend from web 9 in the same axial direction to form a relatively wide cylindrical groove 8 coaxial with sections 10′ and 10″.

An inner thick-walled cylindrical section 6′ and an outer thick-walled cylindrical section 6″ coaxial with axis A are integral with thin-walled sections 10′ and 10″, respectively, at ends thereof opposite annular web 9. Attachment flange 7″ is connected to outer thick-walled section 6″, while inner section 6′ is provided with an inwardly extending annular flange 7′, both flanges 7′ and 7″ extending parallel to web 9 and perpendicularly to axis A. Outer cylinders 6″ and 10″ together form a narrow annular groove 24″ coaxial with wide groove 8. Similarly the inner sections 6′ and 10′ form an inner narrow annular groove 24′.

Inner thick-walled carrier section 6′ and flange 7′ projecting radially inwardly therefrom lockingly engage an outer race 3″ of bearing 3. The meandering or bellows-like cross-section of carrier 4, more particularly the thin-walled central U-shape flanked by a pair of thick-walled Z- or S-profiles, enables a slight axial shifting of bearing 3 due to thermal expansion of shaft 1 and yet ensure a fixed radial or transverse positioning of the bearing. The thin breadth of sections 9, 10′ and 10″, together with the arrangement of grooves 8, 24′ and 24″ facilitates an axial motion of bearing 3, while the annular or toroidal form of the carrier inhibits pivoting of shaft 1 about fixed bearing 2.

As shown in the drawing, inner flange 7′ has an annular face 26 lying in a radial or transverse plane (not illustrated) parallel to plane P. Together with an inner surface 12 of housing cover 16 face 26 defines a gap or disk-shaped chamber 13 which is partially filled with lubricating oil during operation of motor 18. The oil in gap 13 serves as a shock absorber damping sudden shifts in the axial position of shaft 1 due, for example, to changes in load 23. The oil, however, presents no impediment to the thermal expansion of shaft 1, such expansion taking place at a rate which enables an accommodating flow of oil from gap 13.

An inner race 3′ of bearing 3 is fastened to shaft 1 partially by means of a sleeve 25 having an annular flange 27 at one end. Flange 27 is provided with a plurality of radially extending bores 14 for enabling oil vapor or mist from a sump at the bottom of housing 5 to penetrate to a chamber 15 containing the upper balls or rollers of bearing 3, whereby the same are lubricated.

Although bearings 2 and 3 are shown to be ball bearings or roller bearings, they could also take the form of friction, journal, sleeve or sliding bearings. Moreover, sections 6′, 6″, 9, 10′, 10″ of carrier 4 could have smaller diameters than the races 3′ and 3″ of bearing 3, carrier 4 in this case being attached at an inner periphery to shaft 1 and at an outer periphery to inner race 3′.

We claim:
1. A bearing assembly comprising a housing, a bearing having a race centered on an axis and a metallic bearing carrier, said carrier comprising:
  a thin-walled flat annular section lying in a plane substantially perpendicular to said axis;
  a first thin-walled cylindrical section coaxial with said axis and integral at one end with a periphery of said annular section via a thin-walled bend;
  a first thick-walled cylindrical section coaxial with said first thin-walled cylindrical section and integral with an end thereof opposite said annular section, said cylindrical sections together forming a first narrow groove, said first thick-walled cylindrical section having a thick flange forming a first attachment member extending parallel to said annular section;
  a second thin-walled cylindrical section coaxial with said axis and integral at one end with a periphery of said annular section radially spaced from said first thin-walled section via another thin-walled bend, said first and second thin-walled cylindrical sections extending in the same direction from said annular section to form therewith a wide groove coaxial with said first narrow groove and said axis; and
  a second thick-walled cylindrical section coaxial with said axis and integral with an end of said second thin-walled cylindrical section opposite said annular section, and second thick-walled cylindrical section and said second thin-walled cylindrical section together forming a second narrow groove coaxial with said wide groove, said second thick- walled cylindrical section having a second attachment member taking the form of another thick flange extending parallel to said annular section and away from said other thick flange, one of said flanges being connected to said race, the other of said flanges being connected to said housing.

2. The carrier defined in claim 1 wherein said carrier supports a free end of a drive shaft, thereby compensating for thermal expansions thereof during extended power transmission operations, one of said flanges having a smaller diameter than the other flange and a radial face extending perpendicularly to said axis, said face coacting with an inner surface of said housing to form a gap spaced from said free end for receiving a fluid to absorb axial shocks to said shaft.

3. A bearing assembly comprising:
a housing having a pair of axially spaced end plates and a cylindrical body between said end plates;
a shaft extending into said housing through one of said end plates and terminating in said housing adjacent the other of said end plates;
respective bearings at each of said end plates for journaling said shaft relative to said housing, each of said bearings having an inner race mounted on said shaft, and an inner race connected to said housing, said bearings and said shaft defining an axis of rotation of said shaft; and
a bearing carrier for at least one of said bearings in said housing enabling limited axial displacement of said one of said bearings relative to said housing, said carrier being formed unitarily of metal and comprising:
a thin-walled annular section lying in a plane substantially perpendicular to said axis,
respective thin-walled cylindrical sections coaxial with said axis and extending codirectionally from an inner and an outer periphery of said annular section, each of said cylindrical sections being connected to said annular section by a respective thin-walled bend whereby said sections and said bend define a U-section member of constant cross section opening away from said annular section,
respective inner and outer thick-walled cylindrical sections respectively connected to said cylindrical sections and extending coaxially therewith in the opposite direction,
an outer thick-walled flange extending outwardly from said thick-walled cylindrical section in said plane between a corresponding one of said plates and said cylindrical body further securing said carrier in said housing, and
an inner thick-walled flange in said plane extending inwardly from the inner thick-walled cylindrical section and affixed to the outer race of the corresponding bearing.

* * * * *